Jan. 6, 1925.

J. F. GRAY ET AL 1,522,116

CONVEYING APPARATUS

Filed Sept. 14, 1923

INVENTORS
Julian F. Gray
Harry E. McClumpha
BY
Kay, Totten & Brown
ATTORNEYS.

Jan. 6, 1925.

J. F. GRAY ET AL

1,522,116

CONVEYING APPARATUS

Filed Sept. 14, 1923 7 Sheets-Sheet 3

Patented Jan. 6, 1925.

1,522,116

UNITED STATES PATENT OFFICE.

JULIAN F. GRAY, OF PITTSBURGH, AND HARRY E. McCLUMPHA, OF BELLEVUE, PENNSYLVANIA.

CONVEYING APPARATUS.

Application filed September 14, 1923. Serial No. 662,721.

*To all whom it may concern:*

Be it known that we, JULIAN F. GRAY and HARRY E. McCLUMPHA, citizens of the United States, and residents of Pittsburgh and Bellevue, respectively, in the county of Allegheny and State of Pennsylvania, have invented a new and useful Improvement in Conveying Apparatus; and we do hereby declare the following to be a full, clear, and exact description thereof.

Our invention relates to conveyors for use in car-wheel foundries and for other heavy service.

One object of our invention is to provide a conveyor of simple and rugged construction which shall be capable of withstanding severe operating conditions and which, in particular, can be used in conveying car-wheel molds and the like without danger of being damaged if molten metal should be splashed upon the conveyor while the molds are being poured.

More specifically, a principal object of our invention is to provide a conveyor for heavy service which shall consist of an endless series of wheeled links or buggies adapted to support the molds or other loads, and in which the endless conveyor shall be advanced intermittently without the use of sprockets or chains.

Another object of our invention is to provide a conveyor of the character indicated having effective means for taking up the slack in the conveyor and for compensating for any expansion or contraction which may occur under operating conditions.

A further object of our invention is to provide an endless conveyor of the character indicated having simple and effective means for guiding the links or buggies composing the conveyor from an upper level to a lower level at the discharge end of the conveyor, and back to the upper level at the loading end of the conveyor. Other objects and advantages of our invention will appear as the description proceeds.

While our invention is not restricted to the handling of car-wheel molds, it has been developed for this specific purpose, and is designed to receive the mold sections, to transport the molds to the point where the metal is poured into the molds and then to convey the filled molds to a suitable unloading point. Ordinary endless conveyors which are operated by means of chains and sprocket wheels are not suitable for use in car-wheel foundries because of the very heavy loads which they are required to transport, and also because of the conditions existing in the foundry, particularly the liability that molten metal may splash upon the conveyor while the molds are being poured. Such accidental splashing or pouring of metal upon the conveyor, together with the extremes of temperature to which the conveyor is necessarily subjected in the foundry, would soon put out of service an ordinary conveyor of the sprocket and chain type.

In accordance with our present invention, we provide a conveyor consisting of an endless series of buggies which run upon wheels and which themselves form the links of an endless chain. Suitable platforms are carried by the buggies for supporting the molds or other loads to be conveyed. For the purpose of advancing the endless series of buggies in an intermittent manner, we provide reciprocating carriages having dogs for engaging the axles of the buggies, these carriages being suitably actuated by means of air cylinders controlled by a single reversing valve in such a way that the carriages are reciprocated adjacent to the upper and lower levels of the conveyor and simultaneously engage two of the axles. The air cylinders are preferably controlled by an operator who is able to observe the various operations which take place along the conveyor and who advances the conveyor at proper intervals so as not to interfere with these operations, which in the case of car-wheel molds, include the placing of the drag flasks upon the conveyor at the loading end, the mounting of the copes upon the drags, the pouring of the metal into the molds, and the removal of the molds from the conveyor at the unloading end.

Another feature of our invention consists in arranging the endless conveyor in such a way that a portion of the lower run of the conveyor hangs freely, thus providing a gravity takeup which compensates for any expansion or contraction that may take place through wear or through changes in temperature.

For a more detailed description of our invention, reference may now be had to the accompanying drawings in which Fig. 19 is an end view from the left of the parts shown in Fig. 18.

Figure 1:
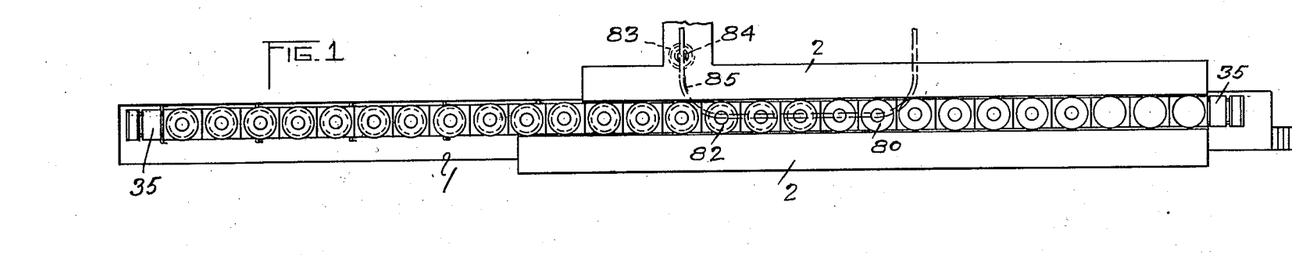
Fig. 1 is a top plan view of a conveyor embodying the present invention.
Figure 2:
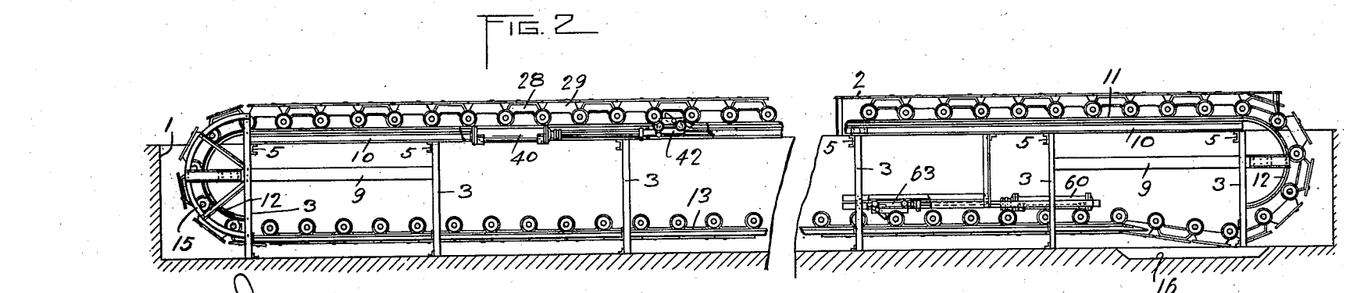
Fig. 2 is a longitudinal vertical section through the pit, with the conveyor shown in side elevation, this view being drawn to a larger scale than Fig. 1.

In the drawings, the numeral 1 indicates a pit in which is erected a supporting frame, the top of which may be substantially at the ground level, as shown in Fig. 2. Work platforms 2 are supported adjacent to the conveyor, as shown in Figs. 1 and 2, and these work platforms are preferably at the level of the conveyor platforms to be described below.

Figure 4:
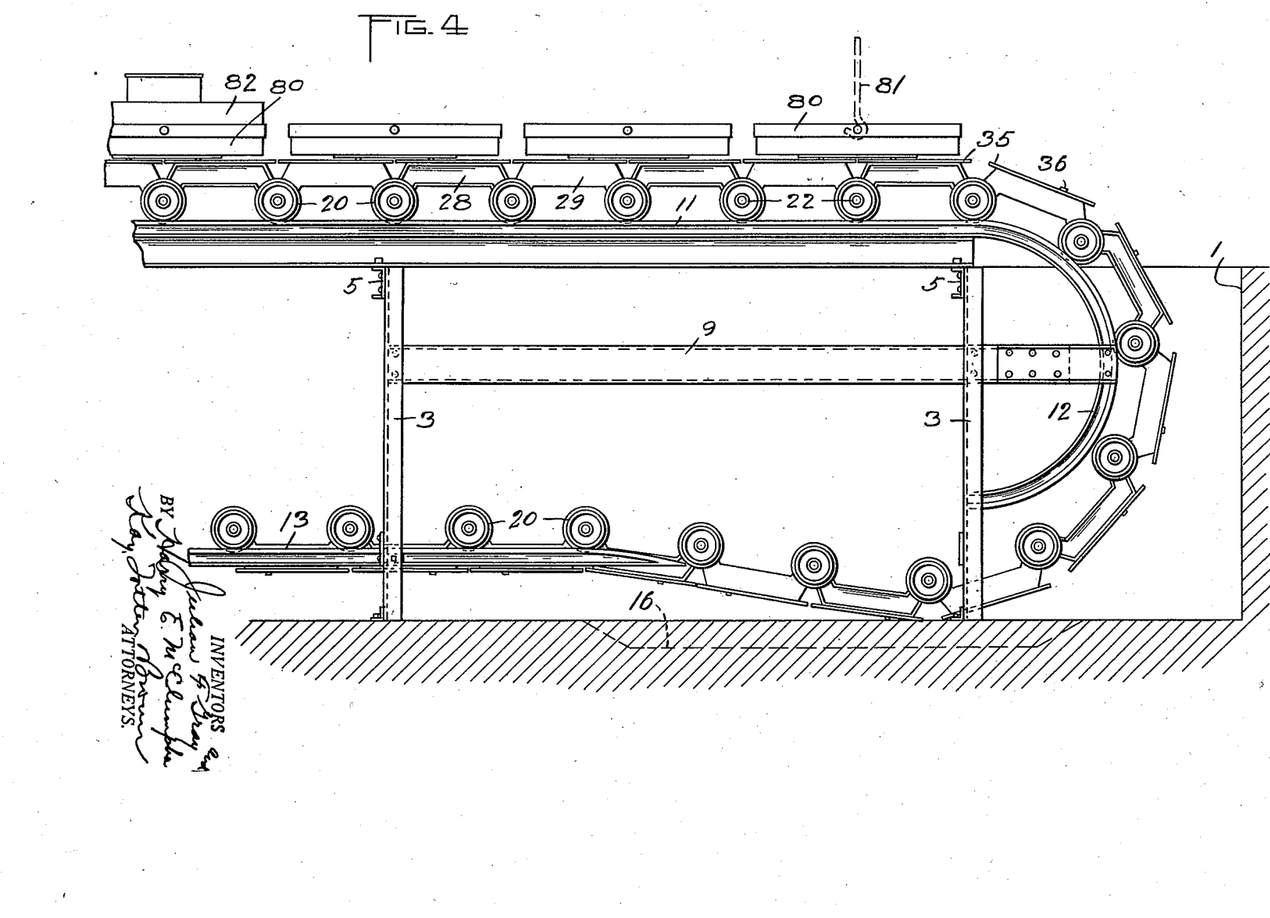
Figs. 4 and 5 are enlarged views similar to Fig. 2 of the loading and discharging ends, respectively, of the conveyor.
Figures 5, 6:
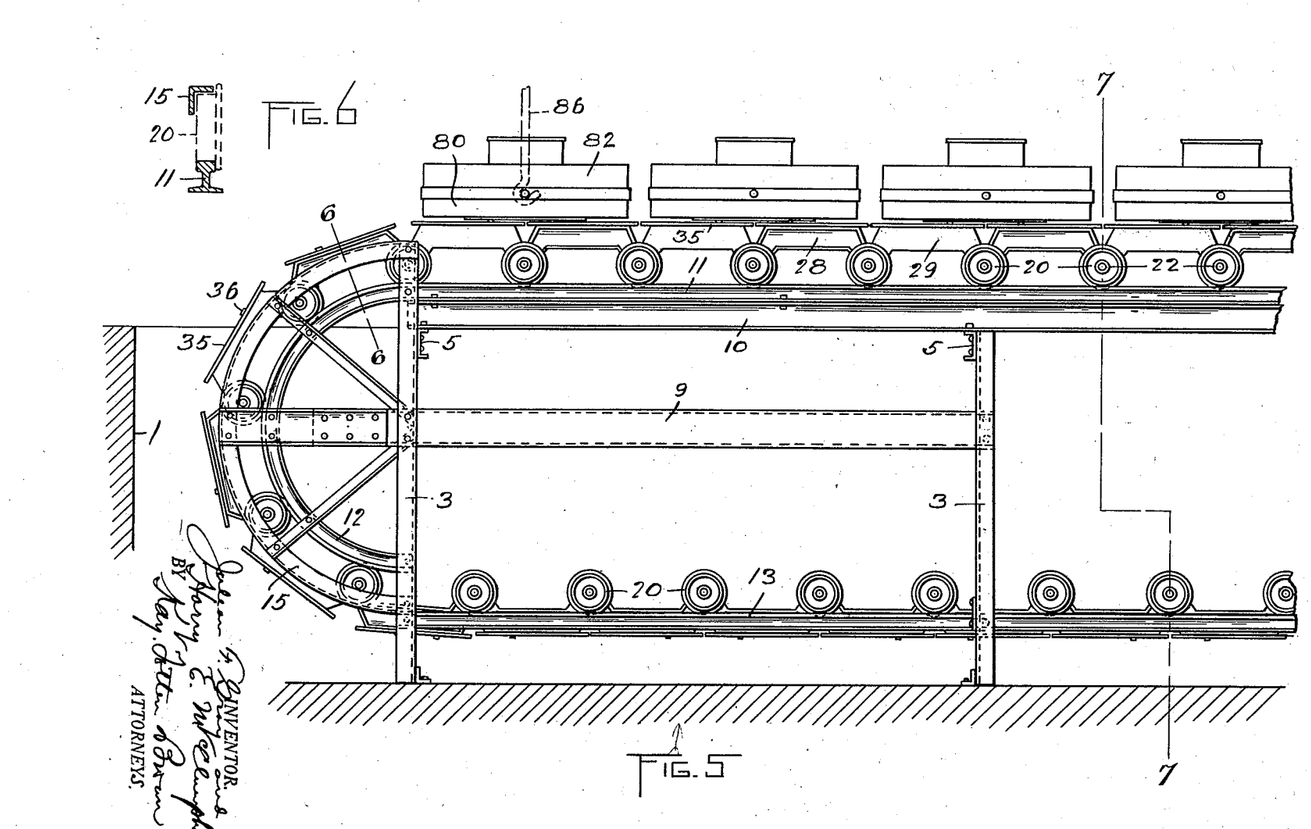
Fig. 6 is a sectional detail on the line 6—6, Fig. 5.
Figures 7, 8:
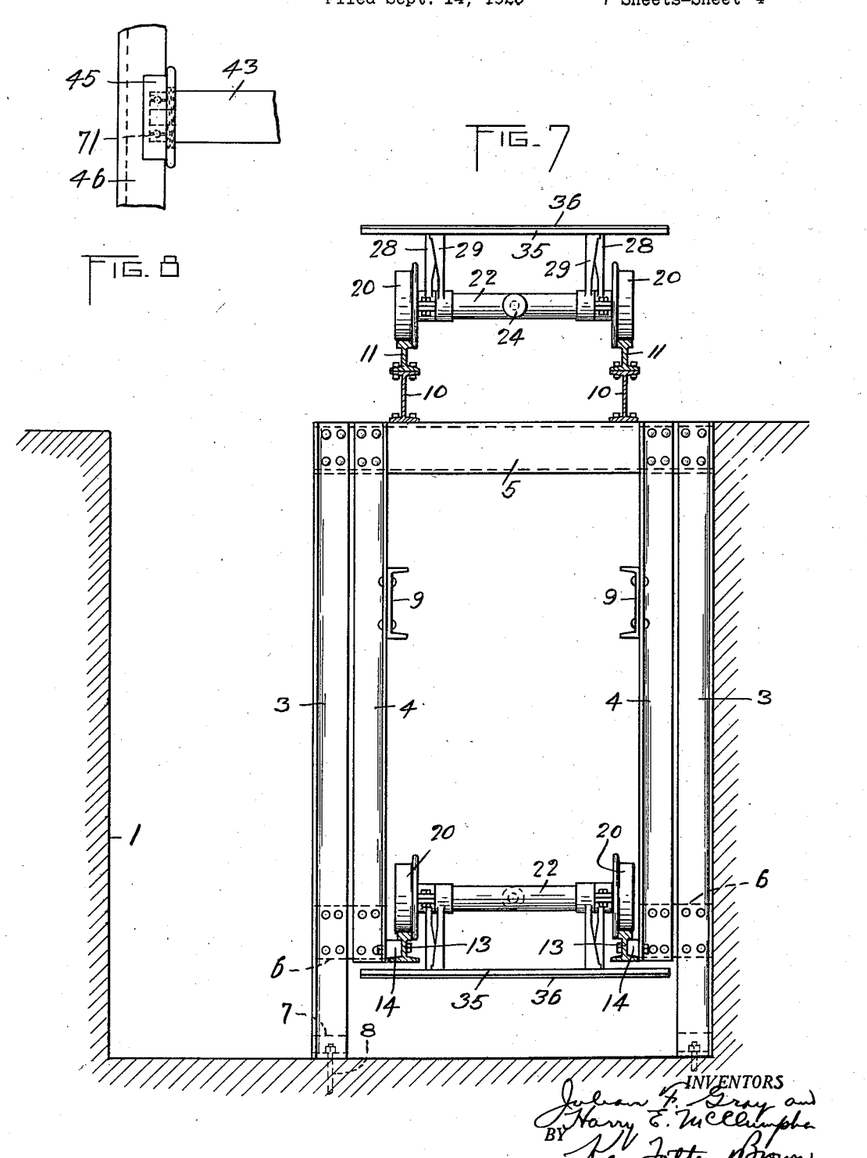
Fig. 7 is a vertical cross section on the line 7—7, Fig. 5.
Fig. 8 is a detail view of one of the carriage wheels.
Figure 9:
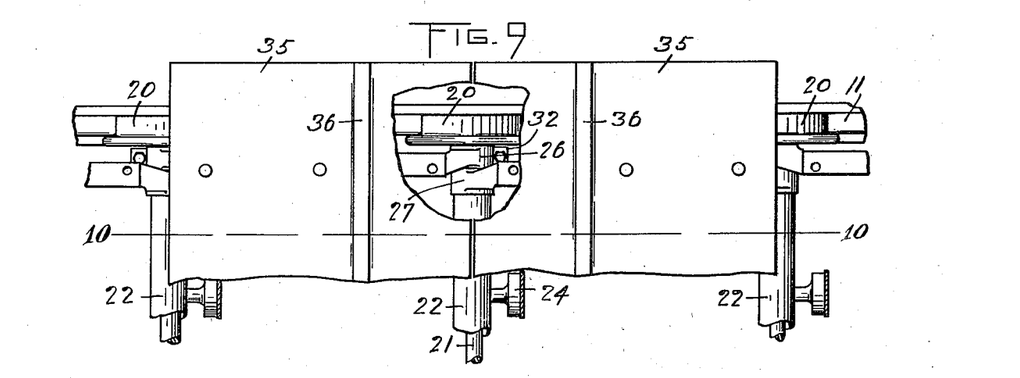
Fig. 9 is a fragmentary top plan view of a portion of the conveyor.

The supporting frame comprises a plurality of regularly spaced upright sections which are composed of outer and inner vertical channel or angle pieces 3 and 4 connected by transverse channels 5 as clearly illustrated in Figs. 4, 5 and 7. The upright members 3 and 4 are connected together in pairs by means of plates 6 and the outer uprights 3 may be secured to a suitable foundation in the bottom of the pit 1 by means of angle pieces 7 and bolts 8. The channels 4 of the upright frame sections at each end of the structure are connected by side frame pieces 9. Supported upon the transverse members 5 of the upright sections of the frame are I-beams 10 to which are bolted top rails 11 which are curved at the ends of the apparatus as indicated at 12, in Figs. 2, 4 and 6. Bottom rails 13 are supported by blocks 14 which, as shown in Fig. 7, are secured to the opposed flanges of the inner members 4 which form part of the upright frame sections.

At the discharge end of the conveyor, as shown in Fig. 5 and at the left of Fig. 2, curved angle-iron pieces 15 are arranged concentric with the curved portions 12 of the upper rails 11. These members 15 act to hold the conveyor wheels in contact with the curved rail portions 12 while the conveyor wheels are descending upon the upper part of the curved track portions 12, when the wheels descend further, the angle members support the weight of the conveyor sections and guide the wheels to the lower rails 13.

At the loading end of the conveyor, as shown in Fig. 4 and at the right of Fig. 2, the lower rails 13 terminate short of the curved portions 12 of the upper rails 11, so that the links of the conveyor, after passing off from the rails 13, are allowed to sag, thus taking up any slack in the conveyor. A depression 16 may be provided in the bottom of the pit 1 to permit the sagging portion of the conveyor to hang freely.

Figures 11, 12, 13:
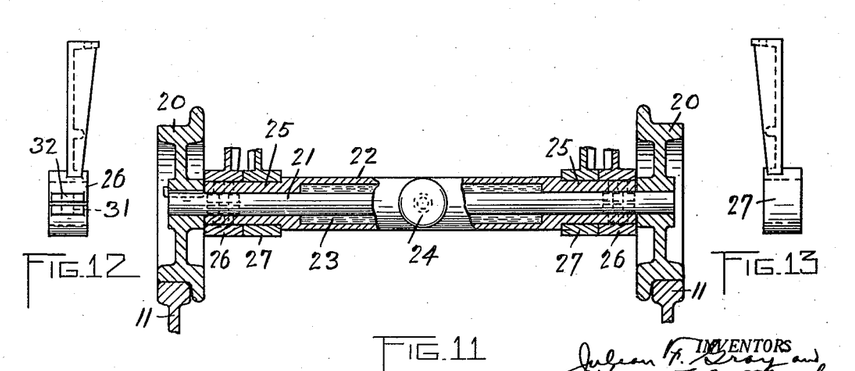
Fig. 11 is a transverse vertical sectional view through one of the axle bearings, as on the line 11—11, of Fig. 10.
Figs. 12 and 13 are detail end views of outer and inner link members, respectively.

The endless conveyor which runs upon the tracks 11 and 13 is constructed as follows:

Flanged wheels 20 are secured to axles 21, one of the wheels of each axle being suitably pressed upon the axle while the other wheel may be keyed to the axle as indicated in Fig. 11. Each axle is mounted to turn in a bearing comprising a sleeve 22 provided with a chamber 23 to contain grease which is supplied from a cup 24. Each of the sleeves 22 has reduced end portions 25 on which are journaled the bearings 26 and 27 of inner and outer link members 28 and 29 which are arranged in pairs at opposite ends of the sleeve 22. The bearings 27 of the outer links 29 may be split, as shown in Figs. 7, 9, 11 and 12, and may be provided with clamping bolts 30 which pass through openings 31 in flanges 32 of the bearings 27. The bearings of the inner link members 28 abut against shoulders formed on the sleeve 22, while the bearings for the outer links 29 abut against the hubs of the wheels 20.

Figure 10:
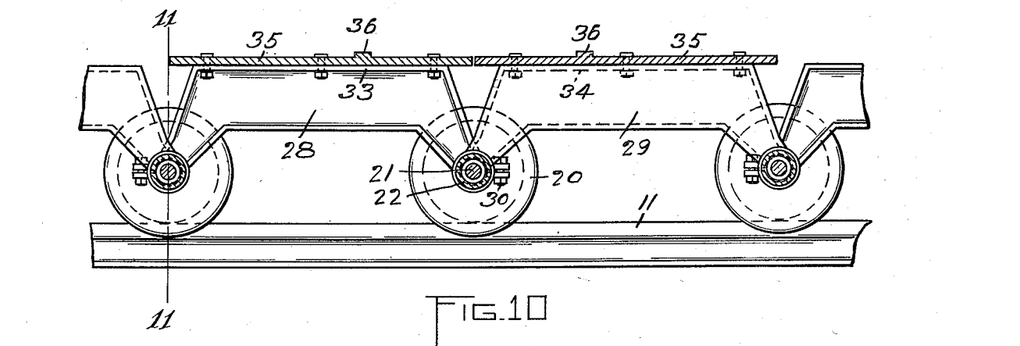
Fig. 10 is a longitudinal vertical sectional view on the line 10—10, Fig. 9.

The link members 28 are provided at their edges with flanges 33, and the link members 29 are provided with similar flanges 34. The link members 28 and 29 in each pair are so arranged that their flanged faces are presented toward each other, as best shown in Figs. 10 and 11, so that the upper horizontal flanges are in line with each other. The pairs of link members 28 and 29 are alternately arranged, and a cover plate or platform 35 is bolted to each pair, forming a series of buggies, which are connected in an endless series by the axle sleeves 20. The cover plates 35 are formed on their top surfaces with transverse ribs 36. As indicated in Figs. 4 and 5 of the drawings, a mold may be supported upon the cover plates 35 of two adjacent links or buggies, resting on the ribs 36.

Supported between the I-beams 10 toward the unloading end of the conveyor is a fluid-pressure driving mechanism which, as shown, includes a standard Curtis air hoist having a cylinder 40, the piston rod 41 of which is secured at its outer end to the forward end of a carriage 42 which is constructed as illustrated in Figs. 14 to 17 inclusive. This carriage comprises transverse frame members 43 connected by lengthwise angle pieces 44 and provided with flanged wheels 45 which travel upon angle pieces 46 which are carried by the I-beams 10 of the main frame. Beneath the frame of the carriage is a transverse member 47 which carries rollers 48 that engage the under sides of the angle pieces 46 to hold the carriage against displacement.

Figures 14, 15, 16, 17:
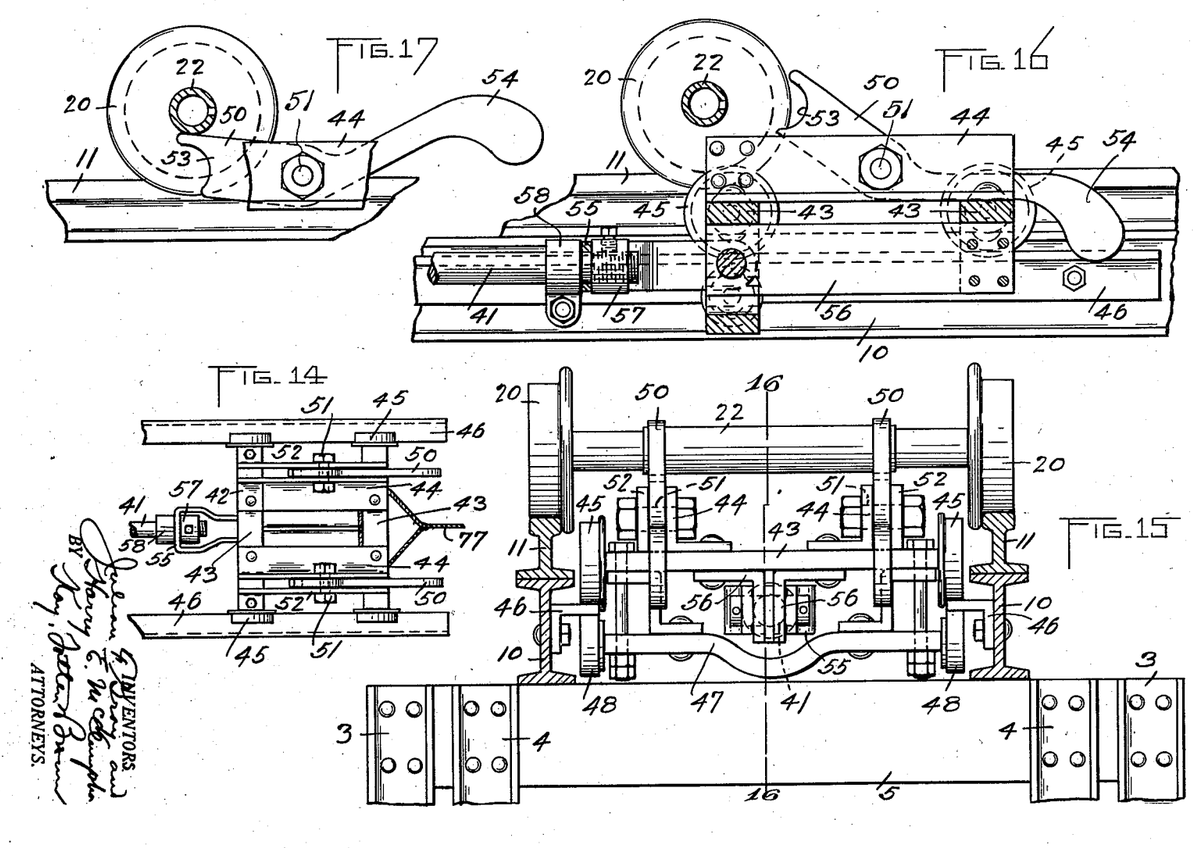
Fig. 14 is a top plan view of the upper carriage.
Fig. 15 is an enlarged end view from the right of the carriage, together with a portion of the conveyor engaged by the carriage dogs and a part of the supporting frame, the latter being shown in transverse vertical section.
Fig. 16 is a vertical sectional view on the line 16—16, Fig. 15, the carriage being shown in position for forward movement.
Fig. 17 is a detail view showing how the gravity dogs engage under an axle on return movement of the carriage.
Figure 17:
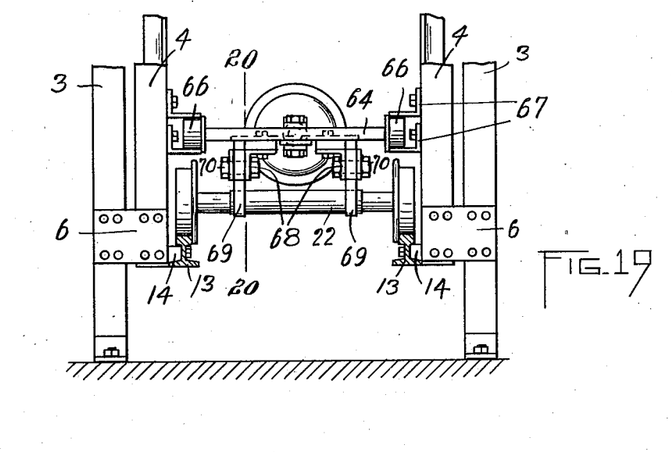

Pivotally mounted on the carriage 42 are two gravity-operated dogs 50 which, when the carriage is moved to the left in Figs. 2 and 16, engage one of the axle bearings 22 of the conveyor units, and thereby move the conveyor a predetermined distance which, in the machine illustrated, is the length of two links or buggies. These dogs are pivoted upon bolts 51 which extend through the vertical flanges of the angle pieces 44 and through plates 52 that are bolted to one of the transverse members 43 of the carriage 42. Each of the dogs 50 has at one end a curved working surface 53 adapted to engage the axle bearings 22 and has a counter-weighted rear portion 54. When the air cylinder 40 is actuated to withdraw the carriage 42 to the right, as seen in Fig. 17, the working portions 53 of the dogs 50 pass idly beneath the axle bearings 22, and are then caused by their counter-weighted ends 54 to rise to the position shown in Fig. 16, where the working portions 53 are ready to engage the adjacent axle bearing 22 on the next forward stroke of the cylinder 40. The piston rod 41 is coupled to the carriage 42 by means of a stirrup 55, the ends of which are bolted to two angle pieces 56 that are secured beneath one of the transverse members 43 of the carriage. The outer end of the piston rod 41 extends through an opening in the enlarged outer portion of the stirrup 55, and is threaded to receive a nut 57 which clamps the stirrup against a collar 58 carried by the piston rod 41.

Figure 18:
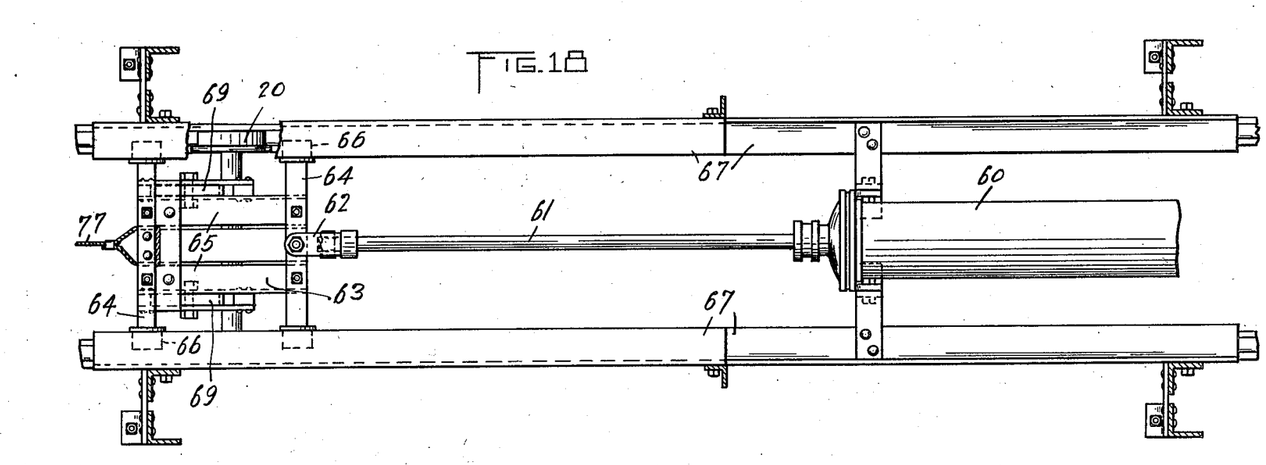
Fig. 18 is a top plan view of the lower carriage and air cylinder, together with parts of the supporting frame.
Figure 20:
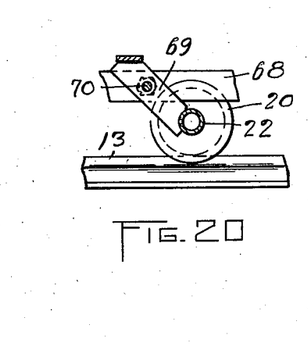
Fig. 20 is a sectional detail on the line 20—20, Fig. 19.

A similar air cylinder 60, operating in the opposite direction with respect to the cylinder 40, is supported adjacent to the lower run of the conveyor near the loading end. The piston rod 61 of the cylinder 60 is connected by means of a coupling 62 to a carriage 63 which is illustrated in Figs. 18, 19 and 20. This carriage is composed of transverse members 64 connected by lengthwise members 65, one of which carries the coupling 62. The transverse members 64 are provided with flanged wheels 66 which are guided between angle pieces 67 that are secured to the uprights 4 of the main frame. Lengthwise angle bars 68 are secured beneath the carriage and carry pivoted gravity operated dogs 69 which are mounted upon bolts 70, and which normally assume the position shown in Fig. 20 where their curved lower ends are at the level of the axle bearings 22.

The dogs 69 act in a similar manner to the dogs 50 except that when the carriage 63 is retracted the dogs 69 pass idly above the axle bearings 22 instead of below the axle bearings. The wheels of the carriages 42 and 63 are preferably provided with ball bearings or roller bearings, a ball bearing 71 being shown in connection with one of the wheels 45 on Fig. 8.

The two air cylinders 40 and 60 are simultaneously controlled by a single operating valve 72 which may be located at any convenient point, preferably upon a raised platform, or at some other position where the operator can see what is taking place along the full length of the conveyor. Air under pressure is supplied to the valve 72 through a pipe 73. From the valve 72 two sets of air lines 74 and 75 are connected to the front and rear ends, respectively, of each of the cylinders 40 and 60. The valve 72 is also provided with an exhaust pipe 76.

Figure 3:
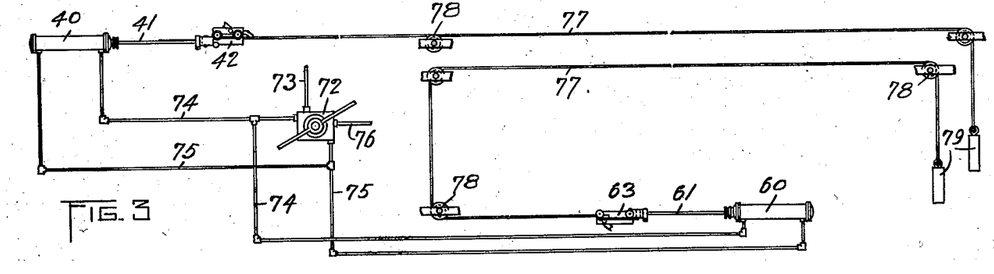
Fig. 3 is a diagrammatic illustration of the operating devices.

When it is desired to draw the carriage 42 to the left, and the carriage 63 to the right, as seen in Figs. 2 and 3, which is the active stroke of these carriages that advances the conveyor, the valve 72 is operated to bring the air line 73 into communication with the air lines 74, whereupon the compressed air passes through the pipes 74, enters the front ends of the cylinders 40 and 60 and forces the piston of the cylinder 40 to the left and the piston of the cylinder 60 to the right. The air in the rear of the pistons escapes through the pipes 75 and the exhaust pipe 76.

When it is desired to move the carriages in their reverse or inactive direction, the valve 72 is operated to bring the supply pipe 73 into communication with the pipes 75 and to bring the pipes 74 into communication with the exhaust pipe 76. The air then enters the rear ends of the cylinders, and causes the pistons to move to the forward ends of the cylinders and effects a return movement of the carriages.

As a further means for returning the carriages to their starting position, the carriages are provided with cables 77 which pass over pulleys 78, as shown diagrammatically on Fig. 3, and are provided at their outer ends with counter-weights 79. These cables and pulleys are so arranged as to not interfere with the operation of the conveyor, and the counter-weights are preferably in such position that the operator manipulating the valve 72 can see them.

Fig. 1 shows the manner in which the conveyor may be used in the handling of car-wheel molds. In this figure, the drag flasks of the molds are indicated at 80, these flasks being made up on a suitable molding machine, not shown, and being brought to the conveyor by means of the usual crane and tackle, which includes hooks 81, one of which is shown in dotted lines in Fig. 4. The cope portions of the completed molds are shown at 82 and are similarly placed upon the drag flasks 80. The molten metal is brought to the molds in a ladle 83 which is hung from a vertically arranged air hoist 84 carried by a wheel running upon an overhead track 85 which is indicated in dotted lines in Fig. 1. The metal is poured from the ladle 83 into the molds in the intervals between the forward movements of the conveyor, and the molds are lifted from the conveyor at the unloading end by means of suitable lifting tackle including hooks, 86, one of which is indicated in dotted lines in Fig. 6.

The operator who controls the valve 42 observes the work of lowering the mold sections, pouring the metal into the molds, and removing the molds from the conveyor, and he operates the valve at such times as will not interfere with the several operations.

While we have shown and described in detail an embodiment of our invention which has been found to be highly satisfactory in actual service, it is to be understood that various changes in the construction and arrangement of parts may be made without departing from our invention, the scope of which is indicated in the appended claims.

We claim as our invention:

1. A conveyor comprising a plurality of wheeled carriers interfitting one carrier with the other connected in an endless series, tracks for supporting the wheels of said carriers, and means for intermittently advancing said carriers from opposite points on the conveyor.

2. A conveyor comprising a plurality of interfitting wheeled carriers hinged together in an endless series, superposed sets of tracks for supporting and guiding the wheels of said carriers, and means for intermittently advancing said series of carriers in one direction simultaneously from opposite ends of the conveyor.

3. A conveyor comprising a plurality of wheeled carriers connected in an endless series, each of the said carriers comprising spaced side members alternately spaced for interfitting one carrier with the other and supported on wheels and a platform carried by said side pieces.

4. A conveyor comprising a plurality of wheeled carriers connected in an endless series, each of the said carriers comprising two side members alternately spaced for interfitting one carrier with the other and having horizontal peripheral flanges, and having their ends terminating in feet supported upon wheels, and a platform extending across and secured to the outer flanges of said side pieces.

5. A conveyor comprising a plurality of axles, wheels carried by said axles, side pieces extending between said axles, each of said axles supporting the ends of two sets of said side pieces, and work-carrying platforms carried by said side pieces.

6. A conveyor comprising a plurality of axles, wheels carried by said axles, side pieces extending between said axles, each of said axles supporting the ends of two sets of said side pieces, and each of said side pieces having a peripheral flange, the said flanges projecting alternately inwardly and outwardly to bring the outer flanges on each side of said conveyor in line with each other, and a work-carrying platform secured to the outer flanges of each pair of said side pieces.

7. A conveyor comprising a plurality of carriers, wheels carried by said carriers, sleeves surrounding the said carriers and having portions of reduced diameter adjacent to the hubs of said wheels, bearings supported in pairs upon the reduced end portions of said sleeves, side pieces supported by said bearings and having horizontal peripheral flanges, the flanges of the side pieces associated with each pair of said bearings being turned in opposite directions to bring the outer portions of said flanges in line with each other, and work-supporting platforms carried by the said side pieces.

8. A conveyor comprising an endless series of carriers and composed of a plurality of axles, wheels carried by said axles, sleeves surrounding said axles and having lubricating chambers, the said sleeves also having reduced end portions adjacent to the hubs of said wheels, bearings mounted in pairs upon the reduced end portions of said sleeves, side pieces carried by the two inner bearings upon each axle sleeve and extending in one direction from said sleeve, other side pieces carried by the outer bearings on each axle and extending in the opposite direction with respect to the first-named side pieces, said flanges of the side pieces associated with each pair of bearings being turned in opposite directions to bring the outer portions of the flanges in line with each other, and work-supporting platforms secured to the outer flanges of said side pieces.

9. A conveyor comprising a plurality of carriers connected in an endless series, and fluid-pressure means engaging with opposite runs of the conveyor for intermittently advancing said carriers.

10. A conveyor comprising an endless series of carriers, superposed tracks for guiding and supporting said carriers, and fluid pressure means engaging simultaneously with opposite runs of the conveyor for intermittently advancing said carriers.

11. A conveyor comprising an endless series of carriers, superposed tracks for guiding and supporting said carriers, means for intermittently advancing said carriers comprising gravity-operated means adapted to engage and move said carriers from opposite directions.

12. A conveyor comprising an endless series of carriers mounted on wheeled axles, and means for intermittently advancing the said series of carriers comprising gravity-operated dogs adapted to engage said axles from opposite directions to move said carriers, and fluid pressure means for reciprocating said dogs.

13. A conveyor comprising an endless series of carriers mounted on wheeled axles, means for intermittently advancing the said series of carriers comprising a wheeled carriage mounted between the runs of the conveyor and adapted to reciprocate adjacent to said series of carriers, and gravity-operated dogs carried by said carriage and adapted to engage and advance said carriers.

14. A conveyor comprising an endless series of wheeled carriers, superposed tracks for guiding and supporting said carriers, and means for intermittently advancing said series of carriers comprising a carriage mounted to reciprocate adjacent to one of the said tracks, dogs carried by said carriage and movable by gravity into position to engage and advance the said carriers, and means for reciprocating said carriage.

15. A conveyor comprising an endless series of carriers having wheels and axles, superposed tracks for guiding and supporting said carriers, two carriages mounted to reciprocate horizontally adjacent to the upper and lower tracks respectively, dogs carried by said carriages and movable by gravity into position to engage said axles and to advance said series of carriers, and fluid-pressure means for reciprocating said carriages.

16. A conveyor comprising an endless series of carriers having wheels and axles, superposed tracks for guiding and supporting said carriers, two carriages mounted to reciprocate horizontally adjacent to the upper and lower tracks, respectively, dogs carried by said carriages and movable by gravity into position to engage said axles and to advance said series of carriers, fluid-pressure means for reciprocating said carriages, and a valve connected to simultaneously operate the said reciprocating means.

17. Means for intermittently advancing an endless conveyor, comprising a wheeled carriage disposed between the runs of the conveyor, tracks for supporting said carriage, pivoted dogs mounted on said carriage and movable by gravity into their operative position, and flexible means for reciprocating said carriage upon said tracks.

18. Means for intermittently advancing an endless conveyor, comprising two wheeled carriages, tracks for supporting each of said carriages, two fluid pressure cylinders, connections between said cylinders and the said carriages, a manually controlled valve connected to operate said cylinders to move said carriages simultaneously in opposite directions, pivoted dogs mounted on said carriages and movable by gravity into operative position, said dogs being also capable of yielding away from their operative position, and a weight connected to assist in moving each of said carriages in one direction.

19. Means for intermittently advancing an endless conveyor, comprising a wheeled carriage having tracks for supporting said wheels, auxiliary guide rollers mounted on said carriage and engaging beneath said tracks for preventing displacement of said carriage, dogs mounted pivotally on said carriage and each having a curved working end and a counter-weighted opposite end, a fluid-pressure cylinder having its piston rod connected to said carriage, and a weight connected to said carriage on the side opposite to said cylinder, said weight serving to assist in moving said carriage away from said cylinder.

In testimony whereof we, the said JULIAN F. GRAY and HARRY E. McCLUMPHA, have hereunto set our hands.

JULIAN F. GRAY.
HARRY E. McCLUMPHA.